United States Patent [19]

Saigusa et al.

[11] Patent Number: 4,771,639
[45] Date of Patent: Sep. 20, 1988

[54] SEMICONDUCTOR PRESSURE SENSOR

[75] Inventors: Tokuji Saigusa; Michiaki Yamagata; Toshio Aga, all of Tokyo, Japan

[73] Assignee: Yokogawa Electric Corporation, Tokyo, Japan

[21] Appl. No.: 92,151

[22] Filed: Sep. 2, 1987

[51] Int. Cl.[4] ............................. G01L 7/08; G01L 9/06
[52] U.S. Cl. ..................................... 73/727; 29/621.1; 73/721; 73/DIG. 4; 338/4
[58] Field of Search ................. 73/721, 727, DIG. 4, 73/754; 338/4; 29/610 SG

[56] References Cited

U.S. PATENT DOCUMENTS

4,622,856 11/1986 Binder et al. ..................... 73/727

Primary Examiner—Donald O. Woodiel
Attorney, Agent, or Firm—Moonray Kojima

[57] ABSTRACT

A pressure sensor which uses a tapered shearing piezoresistance type gage to obtain high output. The components are fabricated to produce a surface of the gage which is protected by an oxide film which is turned into phosphorated silicate glass; a sensor surface which has an MOS structure with a silicon substrate; oxide film and polycrystalline silicon film; with the polycrystalline silicon film being fixed at a potential higher than maximum potential generated by the shearing gate, and the surface of the piezoresistance element are where P-type impurity is diffused to a low density being inverted. Thus, the shearing gage is operated substantially in a bulk, and influence due to impurity ion from an external source is removed. Furthermore, the pressure sensor buffers stress arising within the sensor by use of the polycrystalline silicon film, prevents occurrence of local stress by keeping the passivation film from dropping in surface level, thereby minimizing zero offset of the output and drift.

3 Claims, 10 Drawing Sheets

SEMICONDUCTOR PRESSURE SENSOR

BACKGROUND OF THE INVENTION

1. Field of Invention.

This invention relates to improvements in semiconductor pressure sensors which use a piezo-resistance type gage.

2. Description of the Prior Art

Figure 1:
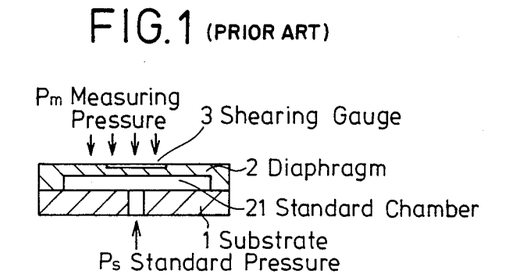
FIGS. 1, 2, 3, 4, 5, and 6 are diagrams depicting a conventional sensor.
Figure 2:
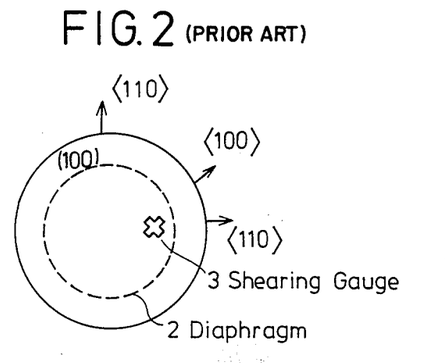
Figure 3:
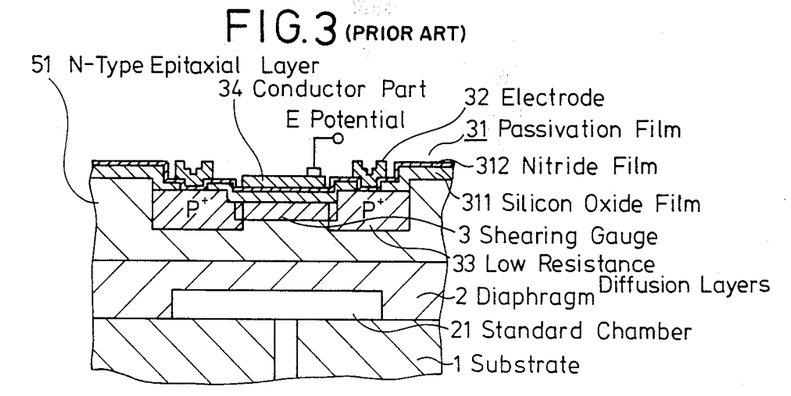

FIGS. 1, 2 and 3 depict a conventional shearing gage made of a piezo-resistance type gage with FIG. 1 being a side sectional view, FIG. 2 being a plan view, and FIG. 3 being a detailed view of the main parts. A conventional shearing gage is disclosed, for example, in U.S. Pat. No. 3,213,681 and Japanese Patent No. 50049/1982.

In FIGS. 1,2 and 3, substrate 1 comprising a semiconductor has a diaphragm 4 mounted thereon for receiving a pressure P to be measured. Diaphragm 2 comprises a semiconductor single crystal having a crystal face (100). In this case, the diaphragm consists of a silicon semiconductor. A standard chamber 21 is provided on diaphragm 2 and receives a standard pressure Ps therein. A shearing gage 3 provided on diaphragm 2 at <100> axially, consists of a semiconductor with a p-type impurity, and is formed using ion implantation, thermal diffusion, etc. A surface of gage 3 is protected by a passivation film 31, as shown in FIG. 3, which consists of a silicon oxide ($SiO_2$) film 311 and a nitride ($Si_3N_4$) film 312, and an output is extracted by an electrode 32 consisting of an aluminum material.

Figure 4:
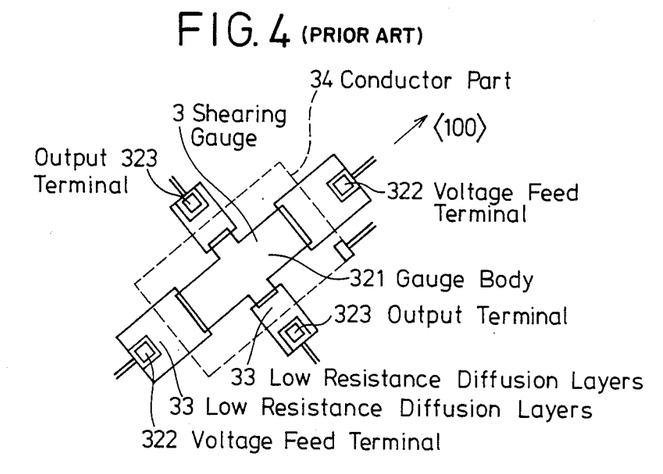

As shown in FIG. 4, gage 3 has a gage body 321 connected to voltage feed terminals 322 and output terminals 323 through low resistance diffusion layers 33 consisting of p+type material. The voltage feed terminals 322 are provided on both ends of gage body 321 and supplied with a constant voltage Vs. The output terminals 323 are provided on gage body 321 orthogonal to the voltage feed terminals 322. A conductor part 34 is formed on the passivation film 31 opposite to shearing gage 3 and is kept at a predetermined potential E. The conductor part 34 comprises an n-type polycrystalline silicon. The conductor part 34 is kept at a constant potential by an external device (not shown).

In the above device, when a measuring pressure Pm is applied to diaphragm 1, an output voltage Eout corresponding to the measuring pressure Pm is obtained from output terminals 323.

Passivation film 31, comprising silicon oxide film 311 and nitride film 312, is formed for shearing gage 3 through thermal diffusion of an impurity, such as boron or the like, from the surface of diaphragm 2. Accordingly, silicon oxide film 311 contains a substantial amount of a moving ion and a surface charge. Thus, a surface field effect is brought to gage 3. When these moving ions and surface charges are subjected to a secular change, a characteristic of the shearing gage changes, and zero offset and drift of the sensor output thus arises.

Figure 5:
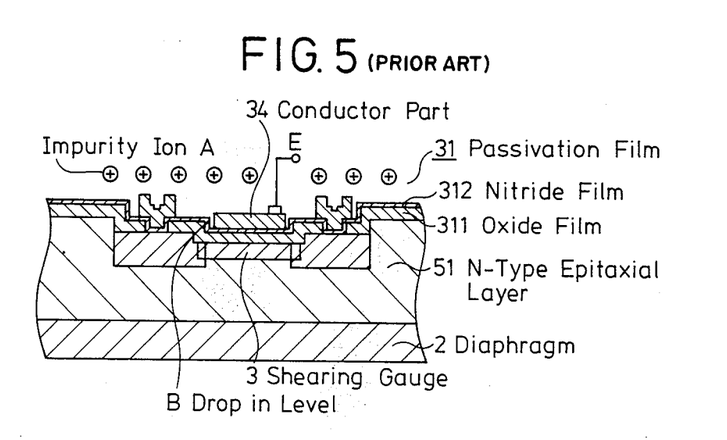

Since conductor part 34 is kept at a constant potential, in case an impurity ion A in an external environment of the apparatus sticks on the surface of the apparatus, as shown in FIG. 5, it is ion A, having stuck on a portion opposite to gage 3 on an outer surface of the passivation film 31, that exerts an infuence on gage 3, and ion A sticks on conductor part 34 made of n-type polycrystalline silicon. A quantity of the sticking ion A changes as time passes, and the changing value comes out as drifting output. It is thus necessary to minimize that influence to insure a stable pressure sensor. Conductor part 34 is made of n-type polycrystalline silicon and is a conductor and is kept at a constant potential. Thus, the potential of the apparatus surface is kept at a constant potential despite existence of impurity ion A. Thus, resistance value and output of gage 3 will not change due to influence of impurity ion A.

Accordingly, zero offset, dispersion of output at every sensor, drift of output, etc, will be minimized, and a semiconductor pressure sensor which is inexpensive, high in reliability and precision is obtained.

However, in the conventional device, since the conductor part 34 is on top of nitride film 312, a separate process is needed to get out ion in the oxide film on the piezoresistance element.

Furthermore, in the prior device, the forming temperature of the passivation film 31 is high (the silicon oxide film 311 being formed at 1,100° C., and the nitride film 312 being formed at about 800° C.). Therefore, residual stress works on a portion of the shearing gage 3 in an operating state under ordinary temperature. The stress is produced according to the difference in coefficients of thermal expansion between the passivation film 31 and the silicon. This causes zero offset. Also, a quantity of stress disperses on a slight difference of the manufacturing process and produces drift with passage of time. This produces deterioration of reliability.

For manufacturing shearing gage 3 through photolithography, it is necessary that thermal diffusion be carried out to form the gage 3. Also, thermal diffusion must be carried out to form the low resistance diffusion layer 33 for lead wire. The thermal diffusion is necessary to be carried out two or more times. Thus, the oxide film surface may drop in level by a drop B.

On the other hand, since passivation film 31 is different in expansion coefficient from diaphragm 2, a film stress is produced when ordinary temperature state occurs after the thermal diffusion. In this case, where passivation film 31 surface has dropped in level, local stress is produced to cause zero offset and drift of the sensor output.

Assuming that tensile stresses in directions x and y arising on the surface of diaphragm 2 are $\sigma_x$ and $\sigma_y$, respectively, $\sigma_x = \sigma_y$ generally barring an end of diaphragm 2. Accordingly, the output of gage 3 becomes zero since shearing stress $\tau_{xy} = (\sigma_x - \sigma_y)/2$ is zero.

Figure 6:
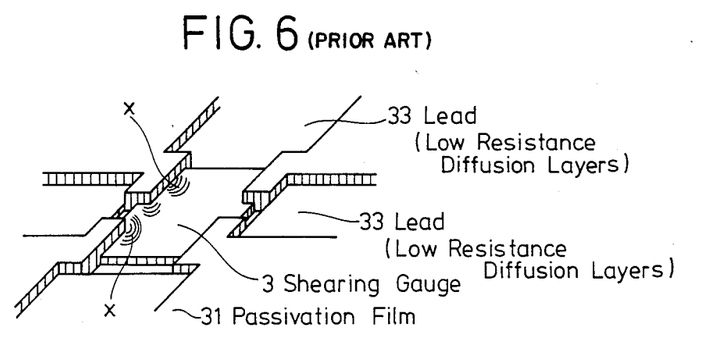

However, if there exists a drop in the level of the film surface and a portion is uneven in film thickness due to photolithography or other reasons, then $\sigma_x \neq \tau_y$, the shearing stress $\tau_{xy} = (\sigma_x - \sigma_y)/2$ is not zero, and thus the output of the gage 3 does not hold zero. The status is shown in FIG. 6. A portion indicated by an arrow X is that in which a local shearing stress arises in concentration.

SUMMARY OF THE INVENTION

Accordingly, an object of the invention is to overcome the aforementioned and other deficiencies and disadvantages of the prior art.

Another object is to provide a sensor which has high reliability, high precision and is inexpensive; and furthermore, which produces high output with large signal to noise ratio, has minimal output fluctuations, and minimal offset and drift.

A further object is to provide a shearing gage having high output by unique structuring of the shape thereof, removing influence due to an impurity ion from the external environment, preventing local stress from arising, and providing a buffer portion to protect against stress.

DETAILED DESCRIPTION OF PREFERRED EMBODIMENTS

Figure 7:
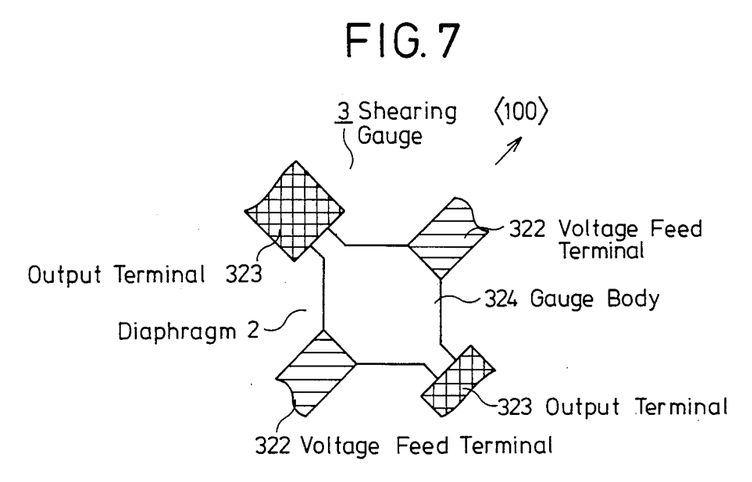
FIG. 7 is a diagram depicting main parts of an illustrative embodiment of the invention.

Turning to FIG. 7, like reference numerals represent like functions in FIGS. 1,2,3 and 4 and only those portions which are different from FIGS. 1,2,3,4, will be described below. A gage body 324 with a crystal axis formed in the direction <100> comprises a p-type semiconductor. The body 324 is tapered to expand gradually from the voltage feed terminal 322 to the output terminal 323. A current $I_1$ flows toward output terminal 323, as shown in FIG. 8, by feed voltage Vs, from a constant voltage supply, being fed to voltage feed terminal 322.

Figures 8, 9:
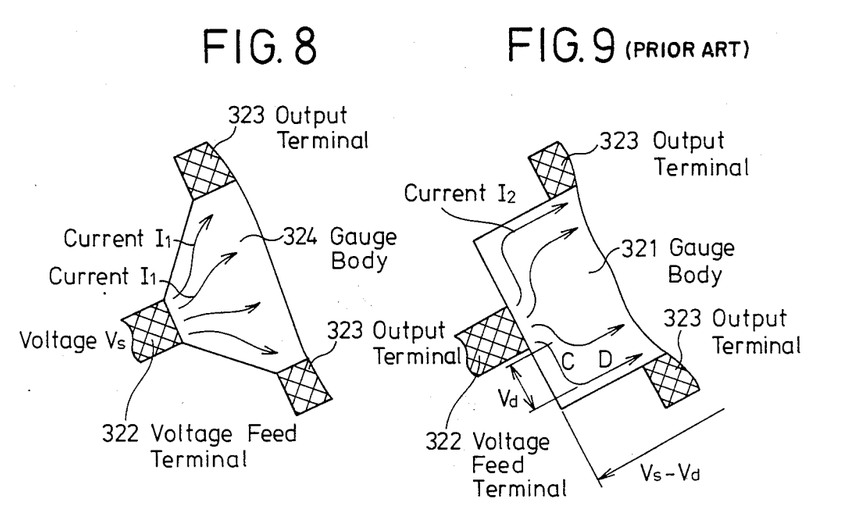
FIGS. 8 and 9 are diagrams used to analyze the performance of the embodiment of FIG. 7.

In contrast, in the prior art shown in FIG. 1, a current $I_2$ flows toward the output terminal 323, as shown in FIG. 9, by feed voltage Vs being fed to voltage feed terminal 322. In this case, a voltage drop Vd arises at a portion indicated by C, and a voltage applied horizontally (portion indicated by D) gets as low as Vs−Vd. Thus, the gage output on output terminal 323 becomes small.

In the invention, there is no portion corresponding to portion C of FIG. 9. Hence, a large gage output is obtained on output terminal 323.

Figure 10:
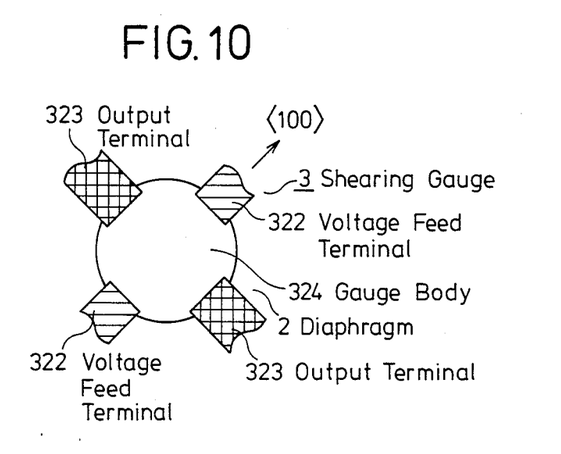
FIGS. 10 and 11 are diagrams depicting other illustrative embodiments of the invention.
Figure 11:
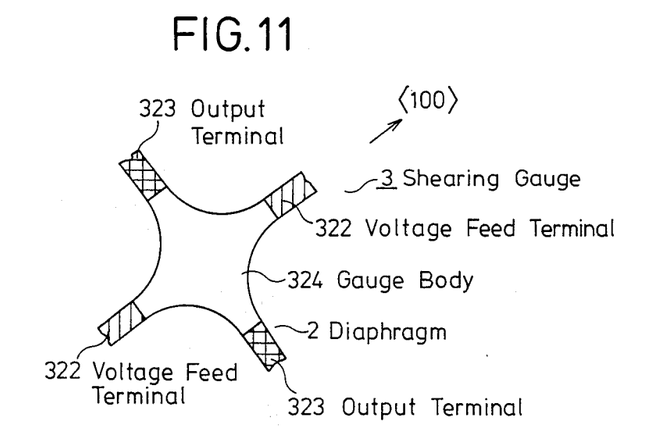

In FIG. 10, gage body 324 is circular in construction. In FIG. 11 gage body 324 is diamond shaped.

Figure 12:
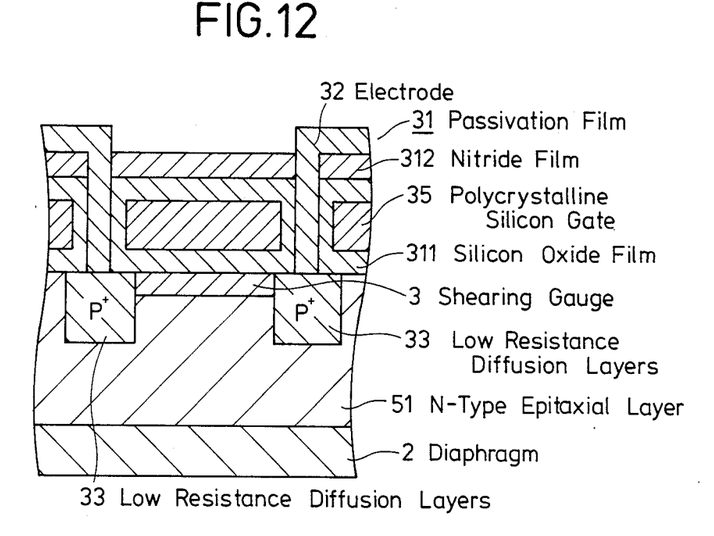
FIG. 12 is a side sectional view depicting the main part of a further illustrative embodiment of the invention.

As shown in FIG. 12, shearing gage 3 is connected to electrodes 32 through the p+-type low resistance diffusion layers 33. A silicon oxide film 311, turned to silicate glass, is formed to cover an outer surface of diaphragm 2. A nitride film 312 covers an outer surface of silicon oxide film 311. The silicon oxide has the chemical formula $SiO_2$, and the nitride has the formula $Si_3N_4$, but for convenience, will be referred to herein as a silicon oxide and nitride.

In the shearing gage, enlargement of geometric dimensions of a resistance is used only to increase the resistance value. Thus, such enlargement does not produce a high output. To obtain high output, it is necessary to increase sheet resistance by minimizing input density of shearing gage 3. If the impurity density of shearing gage 3 is minimized, then it is subject to influence by a contaminant on the surface of the shearing gage 3 and by an external electric field. Hence, the resistance value is capable of becoming unsteady. Thus, oxide film 311, on the surface of shearing gage 3, is cleaned by phosphorating silicate glass.

As a result, the following take place.

1. Since silicon oxide film 311 has a silicate glass phosphorated surface, an ion in the silicon oxide film is subjected to gettering.

2. The impurity ion coming in externally of the sensor can be subjected to gettering to some extent by oxide film 311.

3. The contaminated silicon oxide film 311 is removed after thermal diffusion or ion implantation. Thus, the impurity ion taken into the silicon oxide film 311 can be prevented from sticking on the surface of shearing gage 3.

4. Since a clean and dry oxide film is formed after thermal diffusion, the impurity ion can be minimized for existence as compared with the case where a wet oxide film containing a relatively large amount of impurity is formed.

An apparatus with less zero offset of output and drift can be realized by combining the above (1) through (4) effects.

Nitride film 312 prevents the impurity ion from coming in externally, in addition to preventing gettering effect of the impurity ion by oxide film 311.

As shown in FIG. 12, a polycrystalline silicon gate 35 is formed in silicon oxide film 311 opposite to shearing gage 3. The gage 35 is made conductive by doping with phosphorus. In case gage 3 is p-type, gate 35 is fixed at a potential higher than the maximum potential gnerated by the shearing gage shown in FIG. 13. The sensor surface is given an MOS structure of silicon substrate +oxide film +polycrystalline silicon gate.

Figure 13:
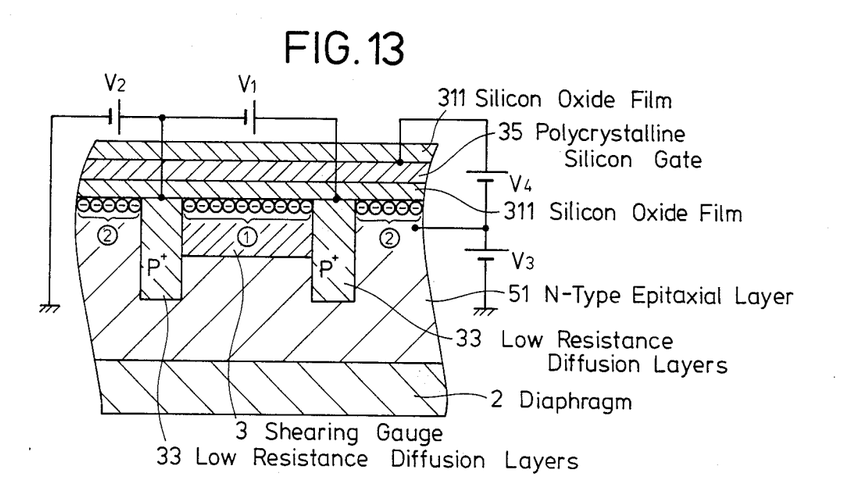
FIGS. 13 and 14 are diagrams depicting performance of the embodiment of FIG. 12.

In FIG. 13, a potential $V_1$ is connected between the low resistance diffusion layers 33. A voltage $V_2$ is used for impressing a constant voltage on the low resistance diffusion layers 33. A voltage $V_3$ is used for impressing a constant voltage on diaphragm 2. A voltage $V_4$ is connected between diaphragm 2 and gate 35. The voltages are $V_3 > V_1 + V_2$. Voltage $V_4$ is positive.

As a result, the following take place.

1. Gate 35 is fixed at a suitable potential higher than maximum potential generated by shearing gage 3. The surface of shearing gage 3 opposite gate 35 is inverted to N-type as shown in FIG. 13. Thus, operating gage 3 substantially in bulk prevents carrier density on the surface of gage 3 from changing according to field change by a charge particle, such as moving ion or the like, which exists in the silicon oxide film on gage 3, and prevents an output from the semiconductor pressure sensor from drifting.

Figure 14:
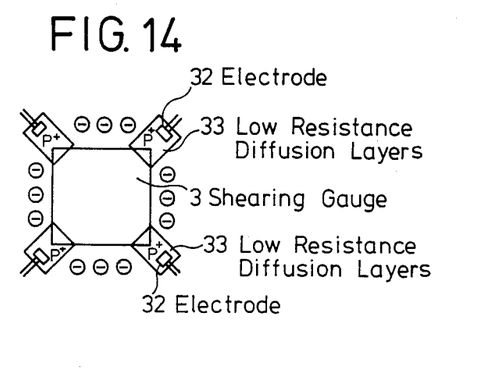

2. Fixing gate 35 at a suitable potential higher than the potential of an N-type silicon causes N-type silicon surface peripheral of gage 3 to be kept accumulated, as shown in FIGS. 13 and 14. This prevents a change in the resistance value of the gage due to inversion or formation of a parasitic current path between p-type diffusion areas isolated by N-type silicon area.

3. Fixing gate 35 at a suitable potential causes a shield effect to be produced from an electric field, due to a charge particle or the like, sticking on the surface of the semiconductor pressure sensor.

4. Silicon oxide film 311, disposed right under gate 35, is turned to PSG (phosphorated silicate glass) by phosphorus diffusion to make gate 35 conductive, thus ensuring a gettering effect. In the case of the prior art, a nitride film 312 would be present under a conductor part 34, thereby preventing gettering from being effected by oxide film 311.

5. Since gate 35 is disposed on silicon oxide film 311, controllability of the gate voltage is enhanced. In contrast, in the prior art of FIG. 3, film 34 is disposed on the surface of nitride film 312 and hence satisfactory voltage controllability is not ensured and high voltage is required for controllability 6. Growth of a nitride film on gate 35 is effective in preventing an external ion from coming into the film.

Referring to FIG. 12, assume that coefficients of thermal expansion of silicon oxide film 311, nitride film 312 and polycrystalline silicon gate 35 are $\alpha_{SiO2}, \alpha_{SN}, \alpha_{PO}$, respectively; and that differences between forming temperature and ordinary temperature of the films are $\Delta T_{SiO2}, \Delta T_{SN}, \Delta T_{PO}$, respectively; and that thicknesses of the films are $t_{SiO2}, t_{SN}, t_{PO}$, respectively; and that coefficient of thermal expansion, thickness and Young's modulus of the silicon semiconductor are $\alpha_{Si}, t_{Si}, E_{Si}$, respectively; then the residual stress $\sigma_{Si}$ arising on the surface of the silicon semiconductor substrate is expressed approximately by the following equation.

$$\sigma_{Si} = \frac{E_{Si}}{t_{Si}} [K_1 \Delta T_{SiO2}(\alpha_{Si} - \alpha_{SiO2})t_{SiO2} - K_2 \Delta T_{SN}(\alpha_{SN} - \alpha_{Si}) \cdot t_{SN} - K_3 \Delta T_{PO}(\alpha_{PO} - \alpha_{Si})t_{PO}] \quad (1)$$

wherein $K_1$, $K_2$ and $K_3$ are constants.

Since $\alpha_{Si} < \alpha_{SiO2}$, $\alpha_{SN} < \alpha_{Si}$, $\alpha_{PO} < \alpha_{Si}$, are known, the residual stress $\sigma_{Si}$ can be minimized by selecting the thickness $t_{PO}$ of the polycrystalline silicon gate 35 suitably to satisfy the following equation.

$$t_{PO} \approx \frac{K_1 \Delta T_{SiO2}(\alpha_{Si} - \alpha_{SiO2})t_{SiO2} - K_2 \Delta T_{SN}(\alpha_{SN} - \alpha_{Si})t_{SN}}{K_3 \Delta T_{PO}(\alpha_{PO} - \alpha_{Si})} \quad (2)$$

Gate 35 facilitates satisfactory reducing of the residual stress to be caused in shearing gage 3 because of the difference in coefficient of thermal expansion between the passivation film 31 and the silicon semiconductor substrate when the sensor is formed.

As a result, occurrence of zero offset, dispersion of output at every sensor, due to a slight difference of manufacturing processes, high cost of adjustment for correction, and further deterioration of reliability due to drift over a period of time, can be prevented accordingly.

As further shown in FIG. 13, the outer surfaces of gage 3 and the low resistance layers 33 are constructed be of even level. To produce the level surfaces, gage 3 and layers 33 are formed through an ion implantation method, rather than impurity doping using a thermal diffusion method. A photoresist mask or an aluminum mask is used for the implantation. Then, film thickness is unified by applying silicon oxide film 311 and nitride film 312 as guard film. Thus, any drop in the level of the surfaces can be prevented from occuring. Accordingly, a zero offset of the sensor due to film stress and drift can be minimized.

As a result, the following take place.

1. Since the outer surfaces of shearing gate 3 and low resistance diffusion layers 33 are constructed to an even plane, passivation film 31 is kept from dropping in surface level. Thus, film stress is prevented from arising locally, and offset of the sensor output and drift are minimized.

2. If the surface of passivation film 31 is flat, then the film 31 is prevented from becoming thick and offset of the sensor output and drift are also prevented since these are due, for example, mismatching of patterns of low resistance diffusion layers 33 by use of photolithography.

3. In a normal thermal diffusion system, thermal diffusion is carried out at the time, for example, of silicon oxide film formation for preparing masks. However, in an ion implantation system, shearing gage 3 and low resistance diffusion layers 33 are prepared for formation through ion implantation, Then, annealing and thermal diffusion can be performed at one time. Thus, a manufacturing process for the device can be reproduced readily and with good results and furthermore, the sensor, is produced at moderate cost.

4. Film stress is caused by the difference in coefficients of thermal expansion. In the invention, since there are no drops in level of the surfaces of the passivation film 31, no large change of film stress according to temperature change results, and film stress does not adversely influence shearing stress. Accordingly, influence of temperature change on film stress does not seriously affect output of the gage 3. That is, temperature zero shift is minimized.

Figure 15:
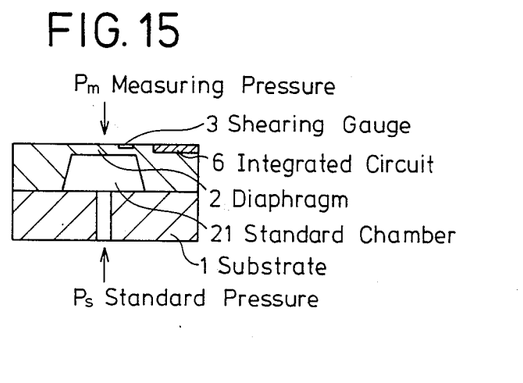
FIG. 15 is a cross sectional view depicting a further embodiment of the invention.

FIG. 15 depicts an integrated circuit part 6 for amplifying an electrical output signal from gage 3 provided around diaphragm 2 on a sensor chip.

By putting gage 3 and integrated circuit part 6 together, high precision temperature compensation is obtained, a signal with satisfactory signal to noise (S/N) ratio is obtained, and furthermore, a sensor high in precision and low in cost is obtained.

Figure 16:
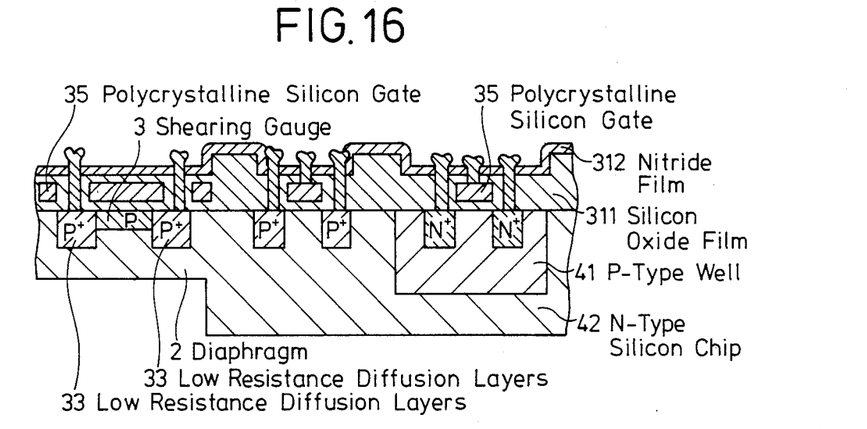
FIG. 16 is a diagram depicting main parts of the embodiment of FIG. 15.

FIG. 16 depicts main parts of the details of fabrication of the embodiment of FIG. 15, wherein an output signal processing circuit of the semiconductor sensor comprises a CMOS transistor. The sensor and the output signal processing circuit are formed on the same chip.

Since the manufacturing process for manufacturing the sensor is available in common with the process for manufacturing the CMOS transistor, the invention can be fabricated easily and inexpensively. In FIG. 16, there is also provided a P-type well 41 and a silicon chip 42.

Figure 17:
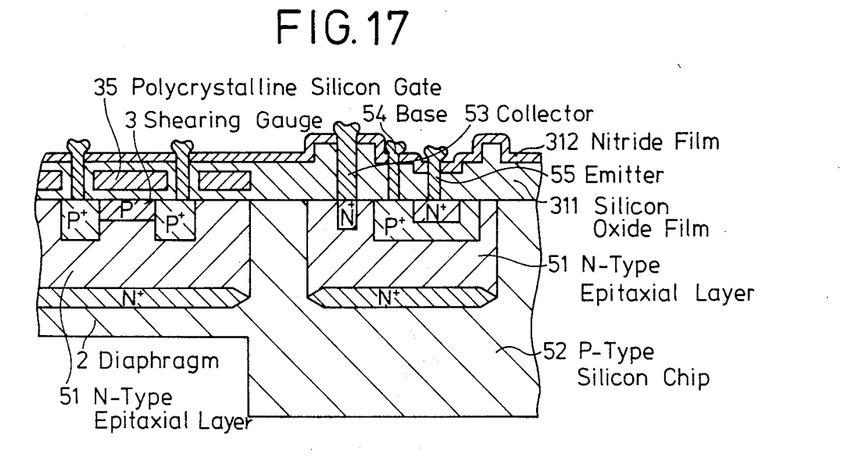
FIG. 17 is a diagram depicting another example of FIG. 15.

FIG. 17 depicts main parts of details of another fabrication technique of another embodiment of FIG. 15, wherein the output signal processing circuit of the semiconductor pressure sensor comprises a bipolar transistor, and the semiconductor pressure sensor and the output signal processing circuit are formed on the same chip. The processes for manufacturing the sensor and the bipolar transistor can be combined, and hence, the invention can be fabricated easily and inexpensively. In FIG. 17, there is also provided an N-type epitaxial layer 51, and a P-type silicon chip 52, with a collector 53, a base 54 and an emitter 55.

Figure 18:
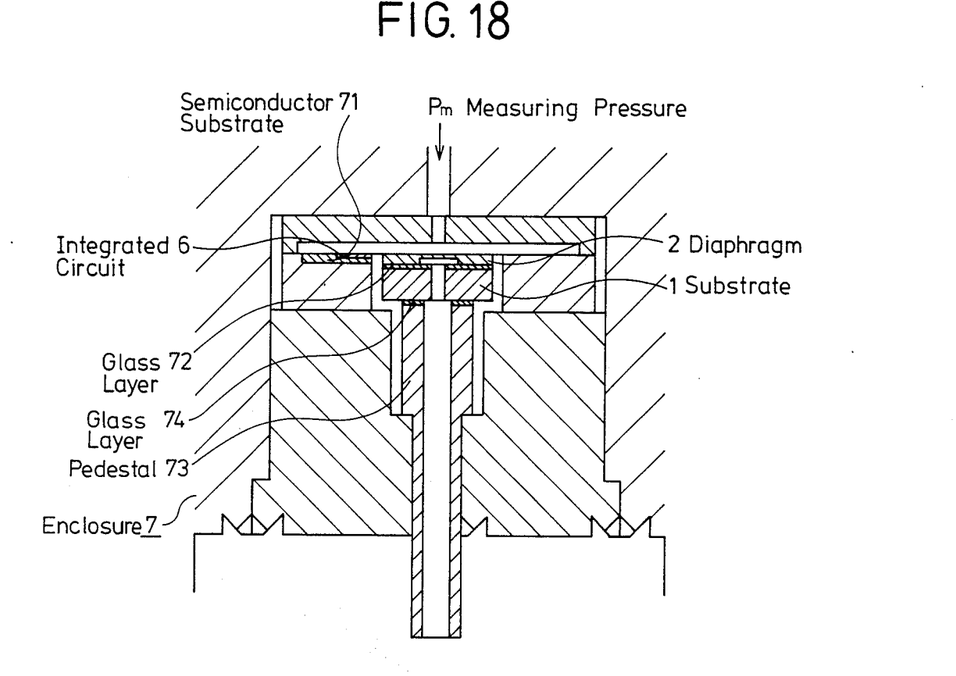
FIG. 18 is a cross sectional view depicting a still further embodiment of the invention.

FIG. 18 depicts details of the fabrication of another embodiment, wherein the semiconductor pressure sensor is incorporated in an enclosure 7. Then, the integrated circuit part 6, for amplifying an electrical output signal of gage 3, is provided on a semiconductor substrate 71 disposed within enclosure 7 near a sensor chip. That is, integrated circuit part 6 is provided separately.

Since the sensor chip and integrated circuit part 6 are fabricated separately, yield is satisfactory. Similar to FIG. 15, with the chip being near the integrated circuit part, no temperature difference arises, and hence high precision temperature compensation is realized. Also, a satisfactory S/N ratio is obtained. The invention produces a sensor which is high in precision and manufactured at low cost.

In the invention, the sensor chip, including diaphragm 2, is joined to substrate 1 consisting of a semiconductor facing in the same direction through a thin glass layer 72 with the crystallographic axis aligned therefor. Furthermore, semiconductor substrate 1 is joined to a metallic pedestal 72 having a coefficient of thermal expansion approximately close to semiconductor substrate 1 through a thin glass layer 74 or glass plate.

Figure 19:
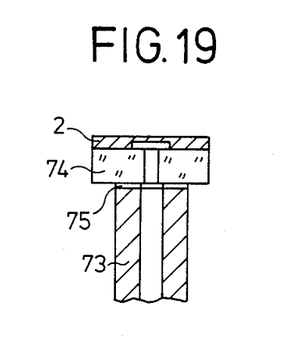
FIG. 19 is a cross sectional view depicting a support portion of the invention.
Figure 20:
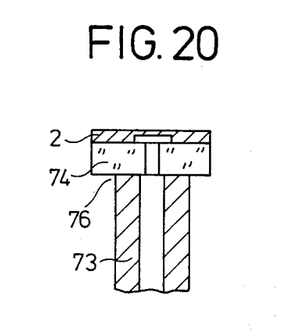
FIG. 20 is a cross sectional view of another support portion of the invention.

Then, as shown in FIG. 19, the sensor chip is fabricated to an anode junction with substrate 74 consisting of a glass material, and the glass substrate 74 is joined to metallic pedestal 73 having a coefficient of thermal expansion approximately close to the glass substrate through a glass 75 having low melting point or, as shown in FIG. 20, through anodic bonding 76.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. In a semiconductor pressure sensor comprising a sensor chip provided with a p-type substrate with a crystal in the direction (100) and an n-type epitaxial layer formed on a surface of said p-type substrate and consisting of a silicon semiconductor crystal, a thin walled straining part provided on said sensor chip and receiving a pressure to be measured to generate stress, a shearing gage provided near a surface of said n-type epitaxial layer on a surface of said thin walled straining part and having a voltage feed terminal and an output terminal; the improvement comprising a gage body tapered to expand gradually from said voltage feed terminal to said output terminal;
a lead with one end connected to said voltage feed terminal;
a second lead with one end connected to said output terminal;
a silicon dioxide film provided on said gage body and turned into a phosphorated silicate glass;
a polycrystalline silicon film provided on said silicon dioxide film and subjected to phosphorus doping after formation to have a conductivity having an electrostatic shielding function, said polycrystalline silicon film fixed at a potential higher than maximum potential gnerated by said gage body when said pressure is applied, thereby functioning as a buffer for stress arising on said gage body;
a nitride film provided on said polycrystalline silicon film for preventing incoming of an external ion;
wherein said silicon dioxide film, said voltage feed terminal, said output terminal, said lead, said second lead, said polycrystalline silicon film, and said nitride film are substantially of flat even surfaces.

2. The Sensor of claim 1, comprising amplification means disposed on said sensor chip for amplifying output of said gage body.

3. The sensor of claim 1, comprising amplifier means disposed on a semiconductor substrate and close to said sensor chip, for amplifying an output from said gage body.

* * * * *